No. 812,214. PATENTED FEB. 13, 1906.
S. H. LAW, H. O. LAW & S. H. LAW, Jr.
HANDLE ATTACHMENT FOR BOWLING BALLS.
APPLICATION FILED APR. 18, 1905.
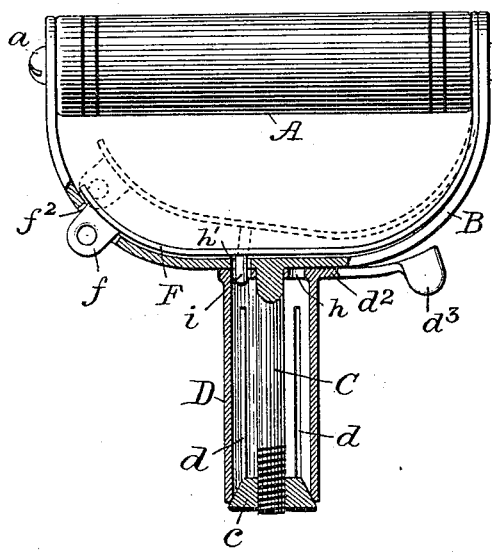
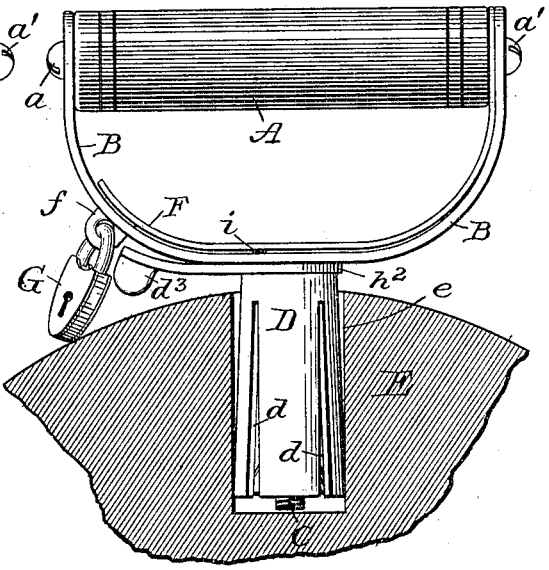
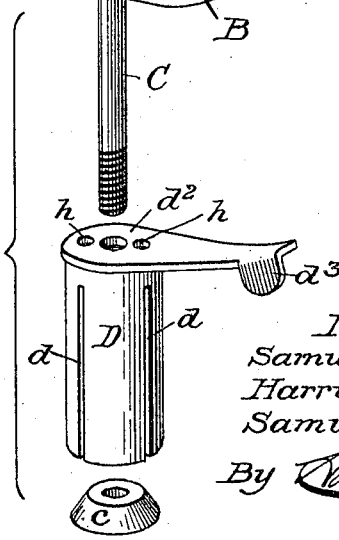
Attest:
Parker H. Sweet Jr.
C. W. Fowler
Inventors:
Samuel H. Law,
Harrison O. Law,
Samuel H. Law, Jr.,
By Orwell Battle
Attorney.

UNITED STATES PATENT OFFICE.

SAMUEL H. LAW, HARRISON O. LAW, AND SAMUEL H. LAW, JR., OF NEW YORK, N. Y.

HANDLE ATTACHMENT FOR BOWLING-BALLS.

No. 812,214.  Specification of Letters Patent.  Patented Feb. 13, 1906.

Application filed April 18, 1905. Serial No. 256,330.

*To all whom it may concern:*

Be it known that we, SAMUEL H. LAW, HARRISON O. LAW, and SAMUEL H. LAW, Jr., citizens of the United States, residing at New York, Brooklyn, in the county of Kings and State of New York, have invented new and useful Improvements in Handle Attachments for Bowling-Balls, of which the following is a specification.

Our invention relates to an attachment for bowling-balls for affording a better means of handling and carrying a ball than is afforded by the finger-holes with which such balls are usually provided.

Expert tenpin-players usually own the ball with which they play and carry it from place to place; and the object of our invention is to provide a convenient handle which may be easily and readily secured to a ball for carrying purposes and so locked thereto as to prevent the ball from being used by other than the owner or holder of the locking-key.

Our invention consists in a handle having a laterally-expansible shank rotatably secured thereto and adapted to enter one of the finger-sockets in a bowling-ball and frictionally engage with the walls thereof, and means whereby said shank may be expanded or contracted by rotating or turning the handle and shank with reference to each other.

Our invention also consists in means for locking the handle and shank against relative movement to prevent the device after being secured to a ball from being detached therefrom, so as to prevent the ball from being used by others than the owner.

It also consists in features of construction which will be hereinafter described, and particularly pointed out in the claims hereunto annexed.

Referring to the drawings furnished and forming a part of this specification, Figure 1 illustrates a device embodying our invention, the same being shown partly in section and partly in side elevation. Fig. 2 is a side elevation of the device secured to a bowling-ball, a portion of the latter being shown in section, and Fig. 3 illustrates the several parts of the device separated from each other.

The handle portion of the device comprises a cylindrical handle-piece A, preferably made of wood, a yoke B, and a bolt or shaft C. The yoke B has its ends secured to the opposite ends of the handle-piece A by screws $a$ $a'$. The bolt or shaft C is fixedly secured to the yoke and projects centrally therefrom to afford proper support for the laterally-expansible shank D, mounted thereon between the yoke and an expanding-nut $c$, the latter being screwed on the end of the shaft, so that it may travel up and down thereon for causing the shank to expand or contract, as required.

The shank D is preferably made of brass or other metal having requisite elasticity and is in the form of a short section of tubing having a diameter slightly less than the diameter of the finger-holes usually provided in bowling-balls. The lower end of the tube or shank is open to receive the expanding-nut $c$, the latter being tapered or conical, as shown, and having its largest diameter greater than the interior diameter and equal to or slightly less than the exterior diameter of the shank. The shank is split, as at $d$, to permit of an expansion of its lower end by an upward movement of the expanding-nut $c$, the tapered wall of the latter being adapted to cause an expansion of the shank by an upward movement of the nut. The upper end of the shank is partially closed by a plate $d^2$, secured thereto and projecting laterally therefrom and having at its projecting end a turned-down portion affording a finger-piece $d^3$, by means of which the shank may be held stationary while the handle is turned, as will be hereinafter described.

When the parts thus far described are properly assembled, the nut $c$ is in frictional engagement with the lower inner edge of the shank D, and as the shank and handle are rotatively connected together a rotation of either while the other is held stationary will cause the nut $c$ to move on the shaft C. When the handle is to be used, the shank is contracted to permit it to enter the socket or finger-hole $e$ in a bowling-ball E. The shank D is then held, by means of the finger-piece $d^3$, while the handle portion is rotated in the direction for expanding the shank, so that the latter will engage the walls of the socket or finger-hole with sufficient friction to securely hold the ball and handle together.

To prevent the ball from being used by others than the owner, we provide means for locking the shank and handle portion of the device against independent rotation. For this purpose we provide a spring arm or strap F, which is secured at one end to the handle-piece A between said handle-piece and the end of the yoke B, a screw $a'$ serving to secure both the strap and yoke to the handle-piece. This strap F is shaped to conform to the shape of the yoke and to lie close to the inner surface thereof. Its free end is provided with a perforated lug $f$, which projects through a slot $f^2$ in the yoke to receive the link of the padlock G, by means of which the strap and yoke are locked together. The upper end of the shank D is provided with one or more holes $h$ (through the plate $d^2$) in proper position to register with a hole $h'$ in the yoke B, and the strap F is provided with a pin $i$, which passes through the hole $h'$ in the yoke and through one of the holes $h$ in the shank D, the handle portion and shank being thus held against independent rotation and the pin $i$ being held in its locking position by means of the padlock G, as will be readily understood. When the device is to be attached to or detached from a ball, the strap F is lifted out of its locking position, as indicated in dotted lines in Fig. 1, the handle and shank being then free to be independently rotated, as described.

Having thus described our invention, what we claim as new, and desire to secure by Letters Patent, is—

1. A handle attachment for bowling-balls, comprising a handle portion and a laterally-expansible shank portion rotatably secured together, said shank being adapted to enter and frictionally engage the wall of a socket in a bowling-ball, and means whereby said shank may be expanded or contracted by independently rotating said handle or shank.

2. A handle attachment for bowling-balls, comprising a handle portion and a laterally-expansible shank rotatably secured thereto, said shank being adapted to enter a socket in a bowling-ball and frictionally engage the walls thereof, means operated by the rotation of the handle for expanding said shank, and a finger-piece projecting laterally from the upper end of said shank.

3. A handle attachment for bowling-balls, comprising a handle portion having a screw-threaded shaft or bolt projecting therefrom, a tubular shank rotatably mounted on said shaft, said shank being split at one end to permit of lateral expansion and contraction, and a conical nut on said shaft having its conical surface in contact with the split end of said shank, whereby independent rotation of said handle portion or shank will cause said shank to expand or contract.

4. A handle attachment for bowling-balls, comprising a handle portion and a laterally-expansible shank rotatably secured together, means whereby said shank will be expanded by independent rotation of said handle or shank, and means for locking said handle and shank against independent rotation.

5. In a handle attachment for bowling-balls, a handle-piece, a yoke secured to the ends thereof, a screw-threaded shaft fixedly secured to said yoke having a conical nut mounted thereon, a tubular shank mounted on said shaft between said yoke and said nut, said shank being split to permit of expansion by said nut, a spring-arm mounted on the handle portion of the attachment, a pin carried by said arm adapted to engage said yoke and said shank for preventing independent rotation thereof, and means for locking said strap and said yoke together.

In testimony whereof we have hereunto set our hands in presence of two subscribing witnesses.

. SAMUEL H. LAW.
HARRISON O. LAW.
SAMUEL H. LAW, JR.

Witnesses:
CHAS. M. THOMPSON,
W. C. RIEFENSTAHL.